US012687634B2

(12) United States Patent
Tsuji et al.

(10) Patent No.: US 12,687,634 B2
(45) Date of Patent: Jul. 21, 2026

(54) ABNORMALITY DETECTION SYSTEM, ABNORMALITY DETECTION DEVICE, ABNORMALITY DETECTION METHOD, AND COMPUTER READABLE MEDIUM

(71) Applicant: NEC Corporation, Tokyo (JP)

(72) Inventors: Akira Tsuji, Tokyo (JP); Shigeo Suzuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 913 days.

(21) Appl. No.: 17/926,669

(22) PCT Filed: May 27, 2020

(86) PCT No.: PCT/JP2020/020832
§ 371 (c)(1),
(2) Date: Nov. 21, 2022

(87) PCT Pub. No.: WO2021/240670
PCT Pub. Date: Dec. 2, 2021

(65) Prior Publication Data
US 2023/0184943 A1      Jun. 15, 2023

(51) Int. Cl.
*G01S 17/42* (2006.01)
*G01S 17/08* (2006.01)
(Continued)

(52) U.S. Cl.
CPC .............. *G01S 17/42* (2013.01); *G01S 17/08* (2013.01); *G01S 17/89* (2013.01); *G08B 21/182* (2013.01)

(58) Field of Classification Search
CPC .......... G01S 17/42; G01S 17/08; G01S 17/89; G08B 21/182; G08B 21/10; G06Q 10/0635; G06Q 50/26
(Continued)

(56) References Cited

U.S. PATENT DOCUMENTS 10,089,417 B2 * 10/2018 Zhang ..................... G06T 17/05
10,529,221 B2 * 1/2020 Jarrell ................... G08B 25/10
(Continued)

FOREIGN PATENT DOCUMENTS

JP      2005-293350 A      10/2005
JP      2013-242186 A      12/2013
(Continued)

OTHER PUBLICATIONS

International Search Report for PCT Application No. PCT/JP2020/020832, mailed on Jul. 14, 2020.

*Primary Examiner* — Susan E. Hodges

(57) ABSTRACT

An abnormality detection system includes a measurement unit configured to acquire at least three-dimensional data indicating a distance to a target and a shape of the target by performing measurement, a central management unit configured to receive the three-dimensional data acquired by the measurement unit from the measurement unit, and a measurement data evaluation unit configured to hold in advance reference three-dimensional data, the reference three-dimensional data being the three-dimensional data to be a reference acquired by the measurement unit in the past, evaluate whether a difference between the three-dimensional data acquired by the measurement unit and the reference three-dimensional data is greater than or equal to a threshold value, and transmit an alarm to the central management unit when a result of the evaluation indicates that the difference is greater than or equal to the threshold value.

12 Claims, 7 Drawing Sheets

(51) Int. Cl.
G01S 17/89 (2020.01)
G08B 21/18 (2006.01)

(58) Field of Classification Search
USPC ............................................................ 356/4
See application file for complete search history.

(56) References Cited

U.S. PATENT DOCUMENTS

2016/0170089 A1* 6/2016 Collins .................. G01V 99/00
702/5
2018/0081341 A1* 3/2018 Unnikrishnan .... G05B 23/0208

FOREIGN PATENT DOCUMENTS

| JP | 2016-075637 A | 5/2016 |
| JP | 2017-033374 A | 2/2017 |
| JP | 2017-215775 A | 12/2017 |
| JP | 2018-073394 A | 5/2018 |
| JP | 2019-067387 A | 4/2019 |
| JP | 2019-209461 A | 12/2019 |

* cited by examiner

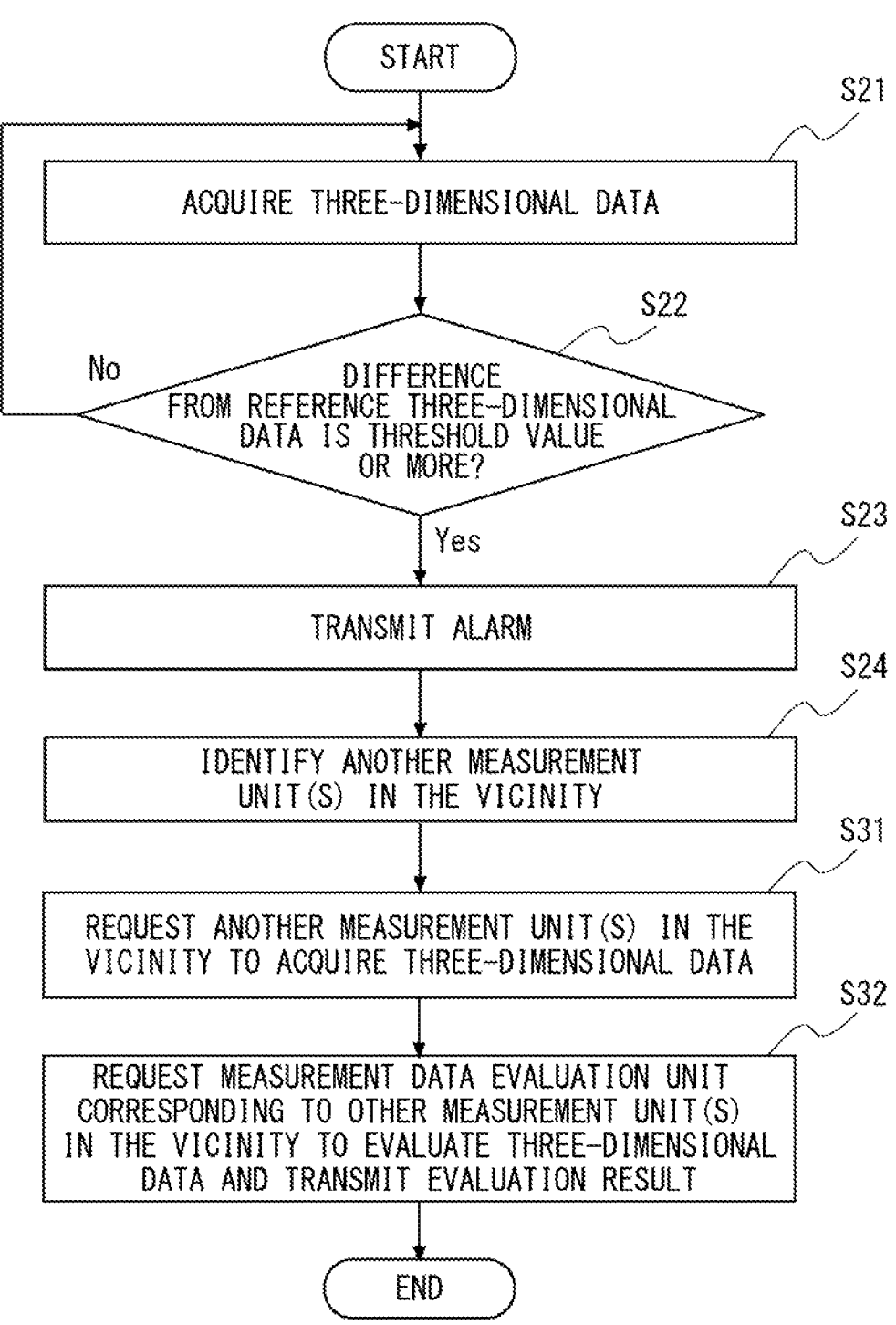

START

ACQUIRE THREE-DIMENSIONAL DATA    S21

DIFFERENCE
FROM REFERENCE THREE-DIMENSIONAL
DATA IS THRESHOLD VALUE
OR MORE?    S22

No

Yes

TRANSMIT ALARM    S23

IDENTIFY ANOTHER MEASUREMENT
UNIT(S) IN THE VICINITY    S24

REQUEST ANOTHER MEASUREMENT UNIT(S) IN THE
VICINITY TO ACQUIRE THREE-DIMENSIONAL DATA    S31

REQUEST MEASUREMENT DATA EVALUATION UNIT
CORRESPONDING TO OTHER MEASUREMENT UNIT(S)
IN THE VICINITY TO EVALUATE THREE-DIMENSIONAL
DATA AND TRANSMIT EVALUATION RESULT    S32

END

Fig. 5

ABNORMALITY DETECTION SYSTEM, ABNORMALITY DETECTION DEVICE, ABNORMALITY DETECTION METHOD, AND COMPUTER READABLE MEDIUM

This application is a National Stage Entry of PCT/JP2020/020832 filed on May 27, 2020, the contents of all of which are incorporated herein by reference, in their entirety.

TECHNICAL FIELD

The present disclosure relates to an abnormality detection system, an abnormality detection device, an abnormality detection, and computer readable media.

BACKGROUND ART

3D-LiDAR (Light Detection And Ranging) is a technique that uses light to measure a distance to a target and a shape of the target. 3D-LiDAR can measure a distance to a target and a shape of the target covering a wide area by using, for example, the Time of Flight (ToF) method, and is therefore used for inspection of infrastructure facilities.

In addition, a technique for installing a measurement unit such as 3D-LiDAR is installed at a field, for example, an infrastructure facility and detecting an abnormality such as a disaster at the field by linking the measurement unit installed at the field with the cloud has recently been proposed (e.g., Patent Literature 1 and 2).

CITATION LIST

Patent Literature

Patent Literature 1: Japanese Unexamined Patent Application Publication No. 2018-073394
Patent Literature 2: Japanese Unexamined Patent Application Publication No. 2019-067387

SUMMARY OF INVENTION

Technical Problem

However, neither Patent Literature 1 nor 2 discloses how measurement data acquired by measurement units installed at the field is specifically handled to detect an abnormality such as a disaster at the field.

An object of the present disclosure is to provide an abnormality detection system, an abnormality detection device, an abnormality detection method, and a computer readable medium that can solve the above problem and can detect an abnormality by using measurement data acquired by a measurement unit.

Solution to Problem

In an example aspect, an abnormality detection system includes:

a measurement unit configured to acquire at least three-dimensional data indicating a distance to a target and a shape of the target by performing measurement;

a central management unit configured to receive the three-dimensional data acquired by the measurement unit from the measurement unit; and a measurement data evaluation unit configured to hold in advance reference three-dimensional data, the reference three-dimensional data being the three-dimensional data to be a reference acquired by the measurement unit in the past, evaluate whether a difference between the three-dimensional data acquired by the measurement unit and the reference three-dimensional data is greater than or equal to a threshold value, and transmit an alarm to the central management unit when a result of the evaluation indicates that the difference is greater than or equal to the threshold value.

In another example aspect, an abnormality detection device includes:

a central management unit configured to receive three-dimensional data acquired by a measurement unit from the measurement unit, the measurement unit being configured to acquire at least the three-dimensional data indicating a distance to a target and a shape of the target by performing measurement; and a measurement data evaluation unit configured to hold in advance reference three-dimensional data, the reference three-dimensional data being the three-dimensional data to be a reference acquired by the measurement unit in the past, evaluate whether a difference between the three-dimensional data acquired by the measurement unit and the reference three-dimensional data is greater than or equal to a threshold value, and transmit an alarm to the central management unit when a result of the evaluation indicates that the difference is greater than or equal to the threshold value.

In another example aspect, an abnormality detection method performed by an abnormality detection device configured to receive three-dimensional data acquired by a measurement unit from the measurement unit, the measurement unit being configured to acquire at least the three-dimensional data indicating a distance to a target and a shape of the target by performing measurement, the abnormality detection method including:

a first step of holding in advance reference three-dimensional data, the reference three-dimensional data being the three-dimensional data to be a reference acquired by the measurement unit in the past; and a second step of evaluating whether a difference between the three-dimensional data acquired by the measurement unit and the reference three-dimensional data is greater than or equal to a threshold value, and sending an alarm when a result of the evaluation indicates that the difference is greater than or equal to the threshold value.

In another example aspect, a non-transitory computer readable medium storing a program for causing a computer configured to receive three-dimensional data acquired by a measurement unit from the measurement unit, the measurement unit being configured to acquire at least the three-dimensional data indicating a distance to a target and a shape of the target by performing measurement to execute:

a first procedure of holding in advance reference three-dimensional data, the reference three-dimensional data being the three-dimensional data to be a reference acquired by the measurement unit in the past; and a second procedure of evaluating whether a difference between the three-dimensional data acquired by the measurement unit and the reference three-dimensional data is greater than or equal to a threshold value, and sending an alarm when a result of the evaluation indicates that the difference is greater than or equal to the threshold value.

Advantageous Effects of Invention

According to the above example aspects, it is possible to achieve an effect of providing an abnormality detection system, an abnormality detection device, an abnormality detection method, and a computer readable medium that can solve the above problem and can detect an abnormality by using measurement data acquired by a measurement unit.

BRIEF DESCRIPTION OF DRAWINGS

FIG. 5 is a flowchart showing another example of a flow of an overall operation of the abnormality detection system according to the second example embodiment;

EXAMPLE EMBODIMENT

Hereinafter, example embodiments of the present disclosure will be described with reference to the drawings. The following descriptions and drawings have been omitted and simplified as appropriate for clarity of explanation. In each of the drawings below, the same elements are denoted by the same signs, and repeated descriptions are omitted as necessary.

In addition, each of the example embodiments described below is assumed to be used for inspecting a field such as outdoor infrastructure equipment by using a measurement unit including 3D-LiDAR. More specifically, each example embodiment assumes that the measurement unit including 3D-LiDAR is installed in the field and used for detecting an abnormality such as a disaster at the field when the measurement unit uses the measurement data acquired in the measurement to detect abnormalities in the field. However, the use of each example embodiment is not limited to this.

First Example Embodiment

First, a configuration example of an abnormality detection system according to a first example embodiment will be described with reference to FIG. 1.

Figure 1:
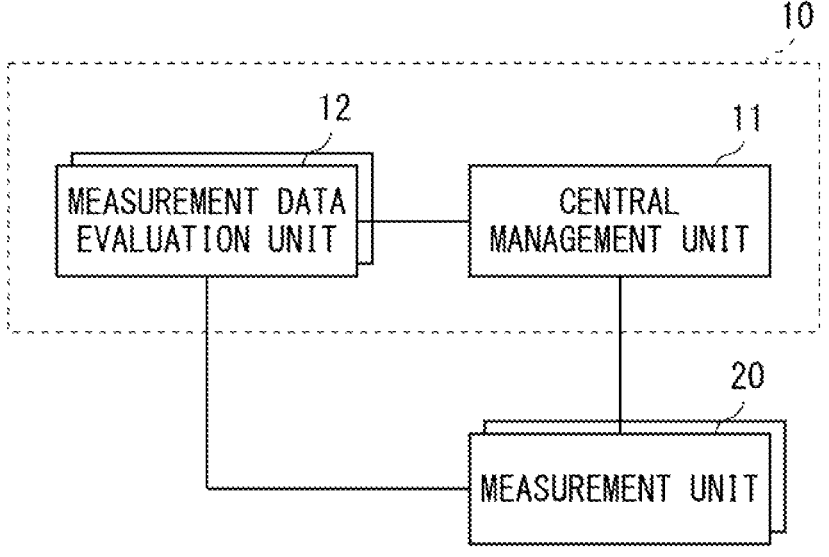
FIG. 1 shows an example of a configuration of an abnormality detection system according to a first example embodiment.

As shown in FIG. 1, the abnormality detection system according to the first example embodiment includes an abnormality detection device 10 and measurement units 20. The abnormality detection device 10 also includes a central management unit 11 and measurement data evaluation units 12.

In FIG. 1, a plurality of the measurement units 20 and a plurality of the measurement data evaluation units 12 are provided, but the present disclosure is not limited to this. One or more measurement units 20 may be provided. The measurement data evaluation unit 12 is provided corresponding to the measurement unit 20, and as many measurement data evaluation units 12 as the measurement units 20 are provided.

Each measurement unit 20 is installed at an outdoor field and includes 3D-LiDAR (not shown). Each measurement unit 20 performs measurement using 3D-LiDAR. At the time of measurement, each measurement unit 20 acquires measurement data (point cloud data) by irradiating a target present at the field with a beam, and transmits the acquired measurement data to the central management unit 11.

Here, each measurement unit 20 can acquire, as the measurement data, three-dimensional data indicating a distance to the target and a shape of the target, and brightness data indicating intensity of reflected light of the beam. However, in the first example embodiment and second example embodiment to be described later, each measurement unit 20 only needs to acquire at least the three-dimensional data as the measurement data. Therefore, in the first example embodiment and second example embodiment to be described later, each measurement unit 20 acquires three-dimensional data as measurement data, and brightness data may or may not be acquired.

Each measurement unit 20 is assigned a unique identifier that uniquely identifies the measurement unit 20.

The abnormality detection device 10 is, for example, disposed on a cloud. However, the measurement data evaluation unit 12 may be disposed outside the abnormality detection device 10. For example, the measurement data evaluation unit 12 may be located at the field where the corresponding measurement unit 20 is installed, or the measurement data evaluation unit 12 may be built into the corresponding measurement unit 20.

The central management unit 11 schedules (sets) the measurement date and time (timing) when each measurement unit 20 performs measurement, and manages the measurement date and time of each measurement unit 20. The central management unit 11 manages a minimum measurement interval which should be satisfied and the last measurement date and time for each measurement unit 20, and schedules the next measurement date and time for each measurement unit 20 so as to satisfy the measurement interval for each measurement unit 20. The central management unit 11 may schedule a default measurement date and time of each measurement unit 20 to perform measurement at regular intervals (e.g., measurement is performed daily at 0 o'clock).

The central management unit 11 transmits a measurement instruction to each measurement unit 20. For example, the central management unit 11 transmits the measurement instruction indicating the measurement date and time to the measurement unit 20, and the measurement unit 20 may perform measurement at the timing of the instructed measurement date and time. Alternatively, the central management unit 11 may transmit a measurement instruction to the measurement unit 20 at the timing of the measurement date and time, and the measurement unit 20 may perform measurement at the timing when the measurement instruction is received.

The central management unit 11 receives the three-dimensional data acquired by each measurement unit 20 from the measurement unit 20. The central management unit 11 transfers the three-dimensional data acquired by each measurement unit 20 to a processing unit (not shown) that inspects the field where the measurement unit 20 is installed. However, the present disclosure is not limited to this, and the central management unit 11 itself may inspect the field by using the three-dimensional data acquired by each measurement unit 20.

Each measurement data evaluation unit 12 holds in advance reference three-dimensional data, which is three-dimensional data to be a reference acquired by the corresponding measurement unit 20 in the past. In the present specification, the reference three-dimensional data is defined as the three-dimensional data acquired by the measurement unit 20 at the field where the measurement unit 20 is installed when no abnormality such as a disaster has occurred in the past.

Each measurement data evaluation unit 12 receives the three-dimensional data acquired by the corresponding measurement unit 20 from the corresponding measurement unit 20. Each measurement data evaluation unit 12 evaluates whether a difference between the reference three-dimensional data of the corresponding measurement unit 20 and the latest three-dimensional data thereof acquired by the corresponding measurement unit 20 is greater than or equal to a threshold value. For example, each measurement data evaluation unit 12 evaluates whether there is a change greater than or equal to a threshold value in the shapes of the targets indicated by the two pieces of the three-dimensional data or in the number of point clouds of the two pieces of the three-dimensional data. When an evaluation result indicates that the difference between the two pieces of the three-dimensional data is greater than or equal to the threshold value, each measurement data evaluation unit 12 generates an alarm to notify that the difference between the two pieces of brightness data is greater than or equal to the threshold value and transmits (sends) the generated alarm to the central management unit 11. At this time, each measurement data evaluation unit 12 includes the identifier of the corresponding measurement unit 20 in the alarm.

In this way, when the central management unit 11 receives the alarm from any of the measurement data evaluation units 12, it determines that an abnormality such as a disaster is occurring in the installation place of the measurement unit 20 whose identifier is included in the alarm.

Figure 2:
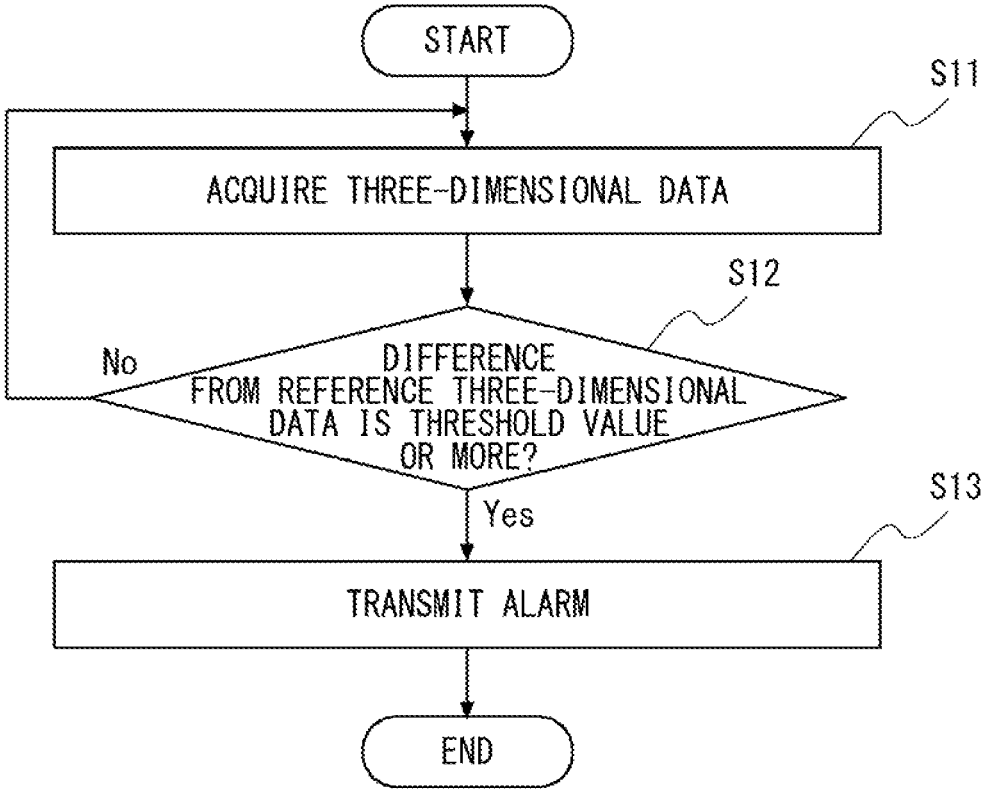
FIG. 2 is a flowchart showing an example of a flow of an overall operation of the abnormality detection system according to the first example embodiment.

Next, an example of a flow of an overall operation of the abnormality detection system according to the first example embodiment will be described with reference to FIG. 2. In FIG. 2, it is assumed that each measurement unit 20 has a default measurement date and time scheduled by the central management unit 11.

As shown in FIG. 2, each measurement unit 20 performs measurement at the measurement date and time scheduled by the central management unit 11, acquires the three-dimensional data in the measurement, and transmits the acquired three-dimensional data to the corresponding measurement data evaluation unit 12 (Step S11).

Each measurement data evaluation unit 12 evaluates whether the difference between the reference three-dimensional data of the corresponding measurement unit 20 and the three-dimensional data acquired by the corresponding measurement unit 20 is greater than or equal to the threshold value (Step S12). If the evaluation result indicates that the difference between the two pieces of the three-dimensional data is not greater than or equal to the threshold value (No in Step S12), the processing returns to Step S11.

On the other hand, if the evaluation result indicates that the difference between the reference three-dimensional data and the three-dimensional data is greater than or equal to the threshold value (Yes in Step S12), each measurement data evaluation unit 12 transmits an alarm including the identifier of the corresponding measurement unit 20 to the central management unit 11 (Step S13).

As described above, according to the first example embodiment, the measurement data evaluation unit 12 holds in advance the reference three-dimensional data, which is the reference three-dimensional data to be a reference acquired by the measurement unit 20 in the past. The measurement data evaluation unit 12 evaluates whether or not the difference between the reference three-dimensional data and the three-dimensional data in the measurement unit 20 is greater than or equal to the threshold value. When the evaluation result indicates that the difference between the two pieces of the three-dimensional data is greater than or equal to the threshold value, the measurement data evaluation unit 12 transmits (sends), to the central management unit 11, an alarm indicating that the difference between the two pieces of the three-dimensional data is greater than or equal to the threshold value.

Therefore, when the three-dimensional data of the measurement unit 20 is changed significantly from the reference three-dimensional data, the central management unit 11 determines that an abnormality such as a disaster is occurring in the installation place of this measurement unit 20. Therefore, an abnormality can be detected by using the measurement data acquired by the measurement unit 20.

Second Example Embodiment

Next, a configuration example of an abnormality detection system according to a second example embodiment will be described with reference to FIG. 3.

Figure 3:
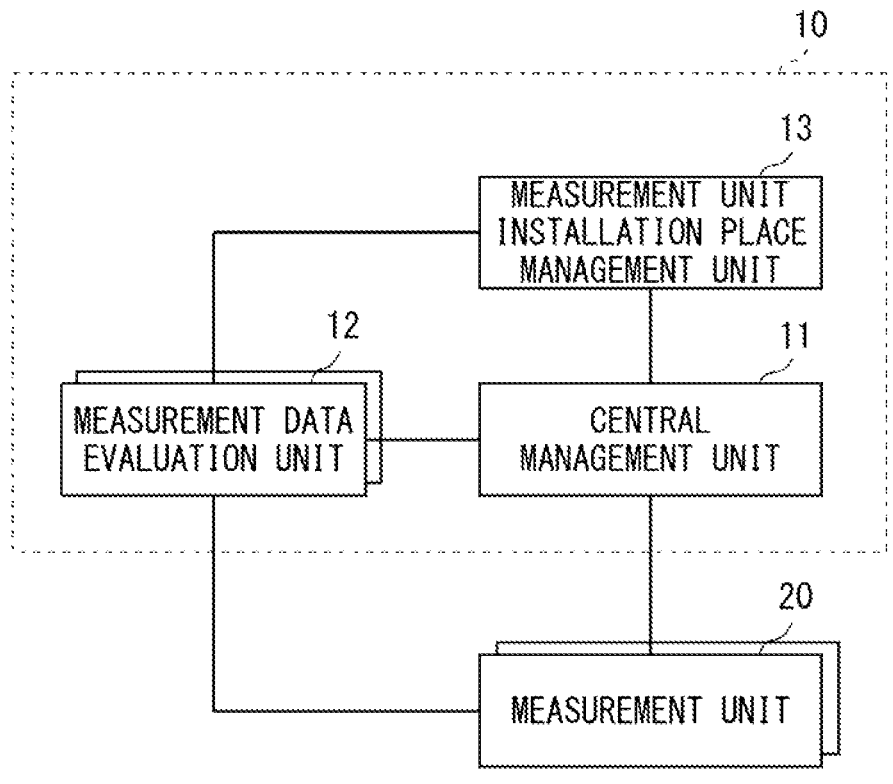
FIG. 3 shows an example of a configuration of an abnormality detection system according to a second example embodiment.

As shown in FIG. 3, the abnormality detection system according to the second example embodiment differs from the configuration according to the first example embodiment described above in that, the abnormality detection system according to the second example embodiment further includes a measurement unit installation place management unit 13 inside the abnormality detection device 10.

For each measurement unit 20, the measurement unit installation place management unit 13 holds in advance installation place information indicating the installation place where the measurement unit 20 is installed and the area including the installation place and the like. The installation place may be indicated by latitude and longitude or an address. The area may be an area divided by any unit, such as an area divided by prefecture, or an area divided by municipality. The measurement unit installation place management unit 13 holds the installation place information about the measurement unit 20 in association with the identifier of the measurement unit 20.

In the second example embodiment, the central management unit 11 and the measurement data evaluation unit 12 operate as follows.

In a manner similar to that of the above first example embodiment, each measurement data evaluation unit 12 evaluates whether the difference between the reference three-dimensional data of the corresponding measurement unit 20 and latest three-dimensional data thereof is greater than or equal to the threshold value, and if the difference between the two pieces of the three-dimensional data is greater than or equal to the threshold value, the measurement data evaluation unit 12 transmits an alarm notifying the central management unit 11 to that effect. At this time, each measurement data evaluation unit 12 includes the identifier of the corresponding measurement unit 20 in the alarm. Alternatively, each measurement data evaluation unit 12 uses the identifier of the corresponding measurement unit 20 as a key to refer to the measurement unit installation place management unit 13 in order to identify the installation place of the corresponding measurement unit 20, and includes the identified installation place in the alarm.

When the central management unit 11 receives the alarm from any of the measurement data evaluation units 12, it refers to the measurement unit installation place management unit 13 to identify one or more other measurement units 20 in the vicinity of the measurement unit 20 (this measurement unit 20 shall be referred to as a measurement unit 20X here) whose identifier or installation place is included in the alarm. The other measurement unit(s) 20 in the vicinity of measurement unit 20X may be, for example, the measurement unit 20 installed in the same area as the area including the installation place of the measurement unit 20X, the measurement unit 20 installed in the area adjacent to the area including the installation place of the measurement unit 20X, or the measurement unit 20 installed within a predetermined range from the installation place of the measurement unit 20X.

When the central management unit 11 identifies the other measurement unit(s) 20 in the vicinity of the measurement unit 20X, it requests the other measurement unit(s) 20 in the vicinity to acquire the three-dimensional data and transmit the three-dimensional data to the central management unit 11. In this case, the central management unit 11 holds in advance the reference three-dimensional data of each measurement unit 20. Next, the central management unit 11 evaluates whether the difference between the reference three-dimensional data of the other measurement unit(s) 20 in the vicinity and the latest three-dimensional data thereof is greater than or equal to the threshold value. If the evaluation result indicates that the difference is greater than or equal to the threshold value, the central management unit 11 can determine that an abnormality such as a disaster is occurring in the installation place(s) of the other measurement unit(s) 20 in the vicinity. In this way, the central management unit 11 can determine the extent to which an abnormality such as a disaster is occurring.

But the present disclosure is not limited to this. The central management unit 11 may request the other measurement unit(s) 20 in the vicinity to acquire the three-dimensional data, and may request the measurement data evaluation unit 12 corresponding to the other measurement unit(s) 20 in the vicinity to evaluate the three-dimensional data in the other measurement unit(s) 20 in the vicinity and to transmit the evaluation result to the central management unit 11. In this case, if the evaluation result indicates that the difference is greater than or equal to the threshold value, the central management unit 11 can determine that an abnormality such as a disaster is occurring in the installation place(s) of the other measurement unit(s) 20 in the vicinity. In this way, the central management unit 11 can determine the extent to which an abnormality such as a disaster is occurring.

It can be also considered that, due to an influence of an abnormality such as a disaster, a communication line between the central management unit 11 and the other measurement unit(s) 20 in the vicinity is cut off, and communication between the central management unit 11 and the other measurement unit(s) 20 in the vicinity is no longer possible. In this case, the central management unit 11 cannot request the other measurement unit(s) 20 in the vicinity to acquire the three-dimensional data, or the like. Therefore, if the central management unit 11 cannot communicate with the other measurement unit(s) 20 in the vicinity for a certain period of time or longer, it may also determine that an abnormality such as a disaster is occurring in the installation place(s) of the other measurement unit(s) 20 in the vicinity.

Figure 4:
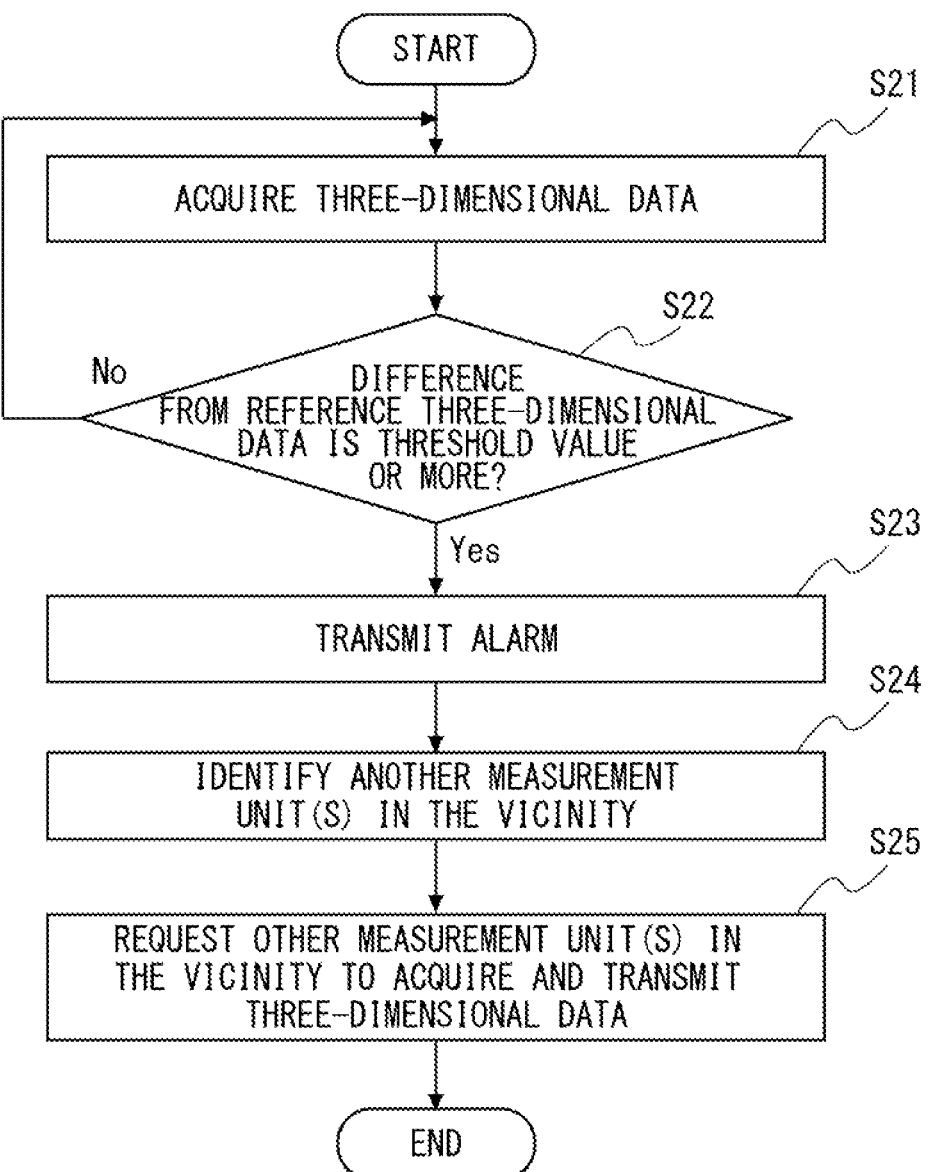
FIG. 4 is a flowchart showing an example of a flow of an overall operation of the abnormality detection system according to the second example embodiment.

Hereinafter, an example of the flow of the overall operation of the abnormality detection system according to the second example embodiment will be described with reference to FIG. 4. In FIG. 4, it is assumed that each measurement unit 20 has a default measurement date and time scheduled by the central management unit 11.

As shown in FIG. 4, Steps S21 to S23 similar to Steps S11 to S13 in FIG. 2, respectively, are performed first. However, in Step S23, unlike in Step S13, each measurement data evaluation unit 12 includes the identifier or installation place of the corresponding measurement unit 20 in the alarm.

When the central management unit 11 receives the alarm from any of the measurement data evaluation units 12, it refers to the measurement unit installation place management unit 13 to identify another measurement unit 20 in the vicinity of the measurement unit 20 whose identifier or installation place is included in the alarm (Step S24).

After that, the central management unit 11 requests the other measurement unit(s) 20 in the vicinity to acquire the three-dimensional data and transmit the three-dimensional data to the central management unit 11 (Step S25).

As shown in FIG. 5, the central management unit 11 may execute Steps S31 and S32 in place of Step S25 in FIG. 4. That is, in Step S31, the central management unit 11 requests the other measurement unit(s) 20 in the vicinity to acquire the three-dimensional data. Furthermore, in Step S32, the central management unit 11 requests the measurement data evaluation unit(s) 12 corresponding to the other measurement unit(s) 20 in the vicinity to evaluate the three-dimensional data in the other measurement unit(s) 20 in the vicinity and transmit the evaluation result to the central management unit 11.

As described above, according to the second example embodiment, for example, when the central management unit 11 receives the alarm from the measurement data evaluation unit 12X corresponding to the measurement unit 20X, it identifies the other measurement unit(s) 20 in the vicinity of the measurement unit 20X. Next, the central management unit 11 requests the other measurement unit(s) 20 in the vicinity to acquire the three-dimensional data and transmit the three-dimensional data to the central management unit 11. Alternatively, the central management unit 11 requests the other measurement unit(s) 20 in the vicinity to acquire the three-dimensional data, and requests the measurement data evaluation unit(s) 12 corresponding to the other measurement unit(s) 20 in the vicinity to evaluate the three-dimensional data and transmit the evaluation results to the central management unit 11.

Therefore, if the central management unit 11 determines that an abnormality such as a disaster is occurring at the installation place where measurement unit 20X is installed, it can also determine whether the other measurement unit(s) 20 are installed in the vicinity of measurement unit 20X and whether an abnormality such as a disaster is occurring. In this way, the central management unit 11 can determine the extent to which an abnormality such as a disaster is occurring.

Other effects are the same as those according to the first embodiment described above.

Another First Example Embodiment

As described above, each measurement data evaluation unit 12 evaluates whether the difference between the reference three-dimensional data of the corresponding measurement unit 20 and the three-dimensional data acquired by the corresponding measurement unit 20 for inspection is greater than or equal to the threshold value.

In this case, differences in the three-dimensional data can be roughly classified into the following two cases.

(A) Cases in which Differences Occur Unevenly (B) Cases in which Differences Occur Evenly Cases in which differences occur unevenly are, for example, cases in which targets such as pillars are distorted or collapsed due to disasters such as earthquakes.

On the other hand, an example of the cases in which the differences occur evenly is a case in which the measurement unit 20 is shifted.

Therefore, each measurement data evaluation unit 12 may capture a change in the three-dimensional data by using any of the following first and second methods taking into consideration the case in which the difference in the three-dimensional data occurs unevenly or evenly.

(1) First Method

In a first method, each measurement data evaluation unit 12 determines, among the targets indicated by the three-dimensional data and the reference three-dimensional data of the corresponding measurement unit 20, the target to be a marker such as the ground as a specific target.

Next, each measurement data evaluation unit 12 corrects the misalignment between the three-dimensional data acquired by the corresponding measurement unit 20 and the reference three-dimensional data of the corresponding measurement unit 20 for the specific target by aligning them.

Then, each measurement data evaluation unit 12 evaluates whether the difference between the three-dimensional data acquired by the corresponding measurement unit 20 and the reference three-dimensional data of the corresponding measurement unit 20 is greater than or equal to the threshold value.

In the first method, even if the measurement unit 20 is misaligned, the misalignment of the measurement unit 20 is corrected by aligning in advance the prior three-dimensional data with the reference three-dimensional data. Therefore, if there are areas where the difference between the three-dimensional data and the reference three-dimensional data is greater than or equal to the threshold value, the situation corresponds to "(A) Cases in which differences occur unevenly" as described above, and a disaster such as an earthquake may be occurring.

Therefore, in the first method, when the difference between the three-dimensional data acquired by the corresponding measurement unit 20 and the reference three-dimensional data of the corresponding measurement unit 20 is greater than or equal to the threshold value, each measurement data evaluation unit 12 transmits an alarm.

In the first method, each measurement data evaluation unit 12 determines a specific target, but the present disclosure is not limited to this. The position of the specific target may be specified in advance in each measurement data evaluation unit 12.

In the first method, each measurement data evaluation unit 12 used the specific target to align the three-dimensional data with the reference three-dimensional data, but the present disclosure is not limited to this. Each measurement data evaluation unit 12 may align the entire three-dimensional data with the entire reference three-dimensional data from the beginning without using a specific target.

(2) Second Method

In a second method, each measurement data evaluation unit 12 divides the area including the target indicated by the three-dimensional data and the reference three-dimensional data of the corresponding measurement unit 20 into a plurality of sections.

Next, each measurement data evaluation unit 12 compares the three-dimensional data acquired by the corresponding measurement unit 20 with the reference three-dimensional data of the corresponding measurement unit 20 for each section, evaluates whether the difference (e.g., a squared sum of the difference between the coordinate values of a point, etc.) between the sections is greater than or equal to the threshold value, and evaluates the degree of variation of the difference between the sections.

In this case, even if the difference is greater than or equal to the threshold value in one or more sections, if the degree of variation of the difference between the sections is less than the specified value (in other words, the variation is small), the situation corresponds to "(B) cases where the difference occurs evenly" mentioned above, and there is a possibility that the measurement unit 20 is simply misaligned. Thus, in this case, each measurement data evaluation unit 12 sends an alarm.

On the other hand, if the difference between one or more sections is greater than or equal to the threshold value and the degree of variation between the sections is greater than or equal to the specified value (in other words, there is a large variation), the situation corresponds to "(A) a case in which a differences are generated unevenly", and a disaster such as an earthquake may be occurring. Thus, in this case, each measurement data evaluation unit 12 transmits an alarm.

Another Second Example Embodiment

According to the above second example embodiment, for example, when the central management unit 11 receives the alarm from the measurement data evaluation unit 12 corresponding to the measurement unit 20X, it can determine whether an abnormality such as a disaster is occurring at the installation place of the measurement unit 20X, and further, it can also determine whether an abnormality such as a disaster is occurring at the installation place of another measurement unit(s) 20 in the vicinity of the measurement unit 20X. In this way, the central management unit 11 can determine the extent to which an abnormality such as a disaster is occurring.

At this time, for example, if another measurement unit(s) 20 in the vicinity of the measurement unit 20X is a measurement unit 20 installed in the same area as the area including the installation place of the measurement unit 20X, or a measurement unit 20 installed in the area adjacent to the area including the installation place of the measurement unit 20X, the central management unit 11 can determine the area where an abnormality such as a disaster is occurring.

Therefore, the central management unit 11 may notify an administrator or the like who manages an inspection target of the area where an abnormality such as a disaster is currently occurring. At this time, for example, the central management unit 11 may create a GUI (Graphical User Interface) screen on which the area where an abnormality such as a disaster is occurring is superimposed on the map, and transmit the created GUI screen to a terminal of the administrator or the like. An example of this GUI screen is shown in FIG. 6.

Figure 6:
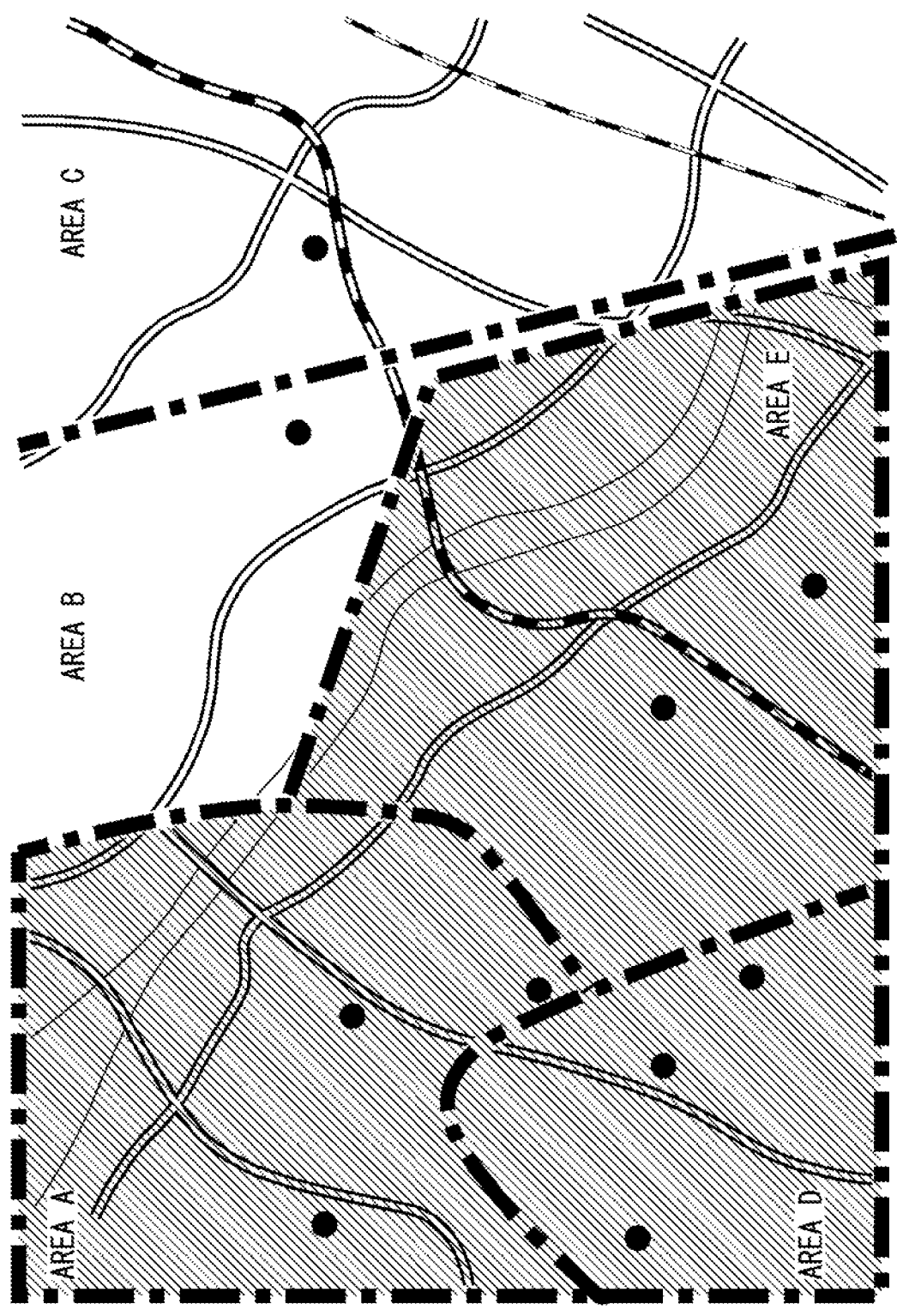
FIG. 6 shows an example of a GUI screen created by a central management unit according to another example embodiment.

In the example of FIG. 6, a map including five areas A to E is displayed. In addition, the fields to be inspected where the measurement units 20 are installed are indicated by black circles on the map. In addition, among the areas A to E, the areas where an abnormality such as a disaster is currently occurring are the areas A, D, and E. The areas A, D, and E are highlighted by the shaded lines.

Another Third Example Embodiment

In the above first and second example embodiments, each measurement unit 20 performs the measurement in accordance with the measurement instruction received from the central management unit 11, and transmits the three-dimensional data acquired in the measurement to the central management unit 11 and the corresponding measurement data evaluation unit 12.

Here, when an abnormality such as a disaster has occurred at the installation place where a certain measurement unit 20 is installed, the central management unit 11 transmits a measurement instruction to instruct the measurement unit 20 to perform measurement for emergency inspection.

However, if the communication line between the measurement unit 20 and the central management unit 11 is cut off and the measurement unit 20 and the central management unit 11 are unable to communicate due to the influence of an abnormality such as a disaster, the central management unit 11 is unable to transmit a measurement instruction to the measurement unit 20 and perform the measurement for emergency inspection.

If communication with the central management unit 11 is not possible for a certain period of time or longer, each measurement unit 20 may transition to an autonomous measurement mode in which measurement is performed autonomously. The measurement unit 20 transitioned to the autonomous measurement mode may, for example, perform measurement at fixed transmission intervals.

In addition, each measurement unit 20 may transmit the three-dimensional data acquired during the autonomous measurement mode to a worker's terminal patrolling the field if communication with the worker's terminal is possible. In this case, communication with the worker's terminal may be wireless communication such as short-range wireless communication or wired communication via cable.

Further, each measurement unit 20 may hold the three-dimensional data acquired during the autonomous measurement mode and transmit it to the central management unit 11 after communication with the central management unit 11 becomes possible. At this time, each measurement unit 20 may notify the central management unit 11 that measurement has been performed in the autonomous measurement mode.

Hardware Configuration of Abnormality Detection Device According to Example Embodiments Next, a hardware configuration of a computer 30 for implementing the abnormality detection device 10 according to the above described example embodiments will be described with reference to FIG. 7.

Figure 7:
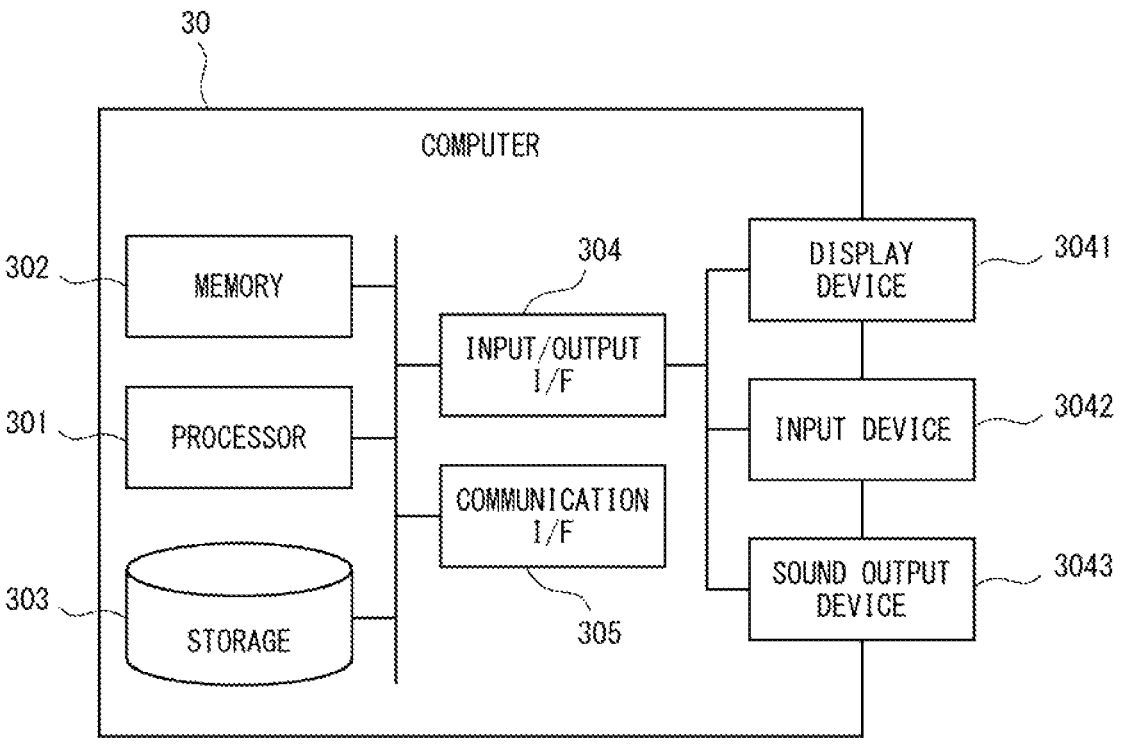
FIG. 7 is a block diagram showing an example of a hardware configuration of a computer for implementing an abnormality detection device according to the example embodiments.

As shown in FIG. 7, the computer 30 includes a processor 301, a memory 302, a storage 303, an input/output interface (input/output I/F) 304, a communication interface (communication I/F) 305, etc. The processor 301, the memory 302, the storage 303, the input/output interface 304, and the communication interface 305 are connected by a data transmission path for transmitting and receiving data to each other.

The processor 301 is, for example, an arithmetic processing unit such as a CPU (Central Processing Unit) or a GPU (Graphics Processing Unit). The memory 302 is, for example, a memory such as RAM (Random Access Memory) or ROM (Read Only Memory). The storage 303 is, for example, a storage device such as an HDD (Hard Disk Drive), an SSD (Solid State Drive), or a memory card. The storage 303 may be a memory such as RAM or ROM.

The storage 303 stores programs for implementing the functions of the components included in the abnormality detection device 10. By executing each of these programs, the processor 301 implements the functions of the components included in the abnormality detection device 10. Here, the processor 301 may execute the above programs after reading them into the memory 302, or may execute them without reading them into the memory 302. The memory 302 and the storage 303 also serve to store information and data held by the components of the abnormality detection device 10.

Further, the above program can be stored and provided to a computer (including the computer 30) using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc ROM), CD-R (CD-Recordable), CD-R/W (CD-Rewritable), and semiconductor memories (such as mask ROM, PROM (programmable ROM), EPROM (erasable PROM), flash ROM, RAM. The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The input/output interface 304 is connected to a display device 3041, an input device 3042, a sound output device 3043, etc. The display device 3041 is a device that displays a screen corresponding to drawing data processed by the processor 301, such as an LCD (Liquid Crystal Display), CRT (Cathode Ray Tube) display, or monitor. The input device 3042 is a device that accepts the operator's operational input, such as a keyboard, mouse, and touch sensor. The display device 3041 and the input device 3042 may be integrated and implemented as a touch panel. The sound output device 3043 is a device such as a speaker that outputs sound corresponding to the sound data processed by the processor 301.

The communication interface 305 transmits and receives data to and from an external device. For example, the communication interface 305 communicates with the external device via a wired or wireless channel.

Although the present disclosure has been described above with reference to the example embodiments, the disclosure is not limited to the example embodiments described above. Various changes in the configuration and details of the present disclosure may be made that would be understandable to a person skilled in the art within the scope of the present disclosure.

For example, some or all of the above example embodiment may be used in combination with each other.

The whole or part of the exemplary embodiments disclosed above can be described as, but not limited to, the following supplementary notes.

(Supplementary Note 1)

A scheduling system comprising:

a measurement unit configured to acquire at least three-dimensional data indicating a distance to a target and a shape of the target by performing measurement;

a central management unit configured to receive the three-dimensional data acquired by the measurement unit from the measurement unit; and a measurement data evaluation unit configured to hold in advance reference three-dimensional data, the reference three-dimensional data being the three-dimensional data to be a reference acquired by the measurement unit in the past, evaluate whether a difference between the three-dimensional data acquired by the measurement unit and the reference three-dimensional data is greater than or equal to a threshold value, and transmit an alarm to the central management unit when a result of the evaluation indicates that the difference is greater than or equal to the threshold value.

(Supplementary Note 2)

The abnormality detection system according to Supplementary note 1, further comprising:

a plurality of the measurement units;

an installation place management unit configured to hold installation place information indicating an installation place of each of the measurement units in advance, wherein when the central management unit receives the alarm indicating that the result of the evaluation on the three-dimensional data in any of the plurality of the measurement units shows that the difference is greater than or equal to the threshold value, the central management unit identifies the measurement unit in the vicinity of the measurement unit which has evaluated that the difference is greater than or equal to the threshold value by referring to the installation place management unit, and the central management unit requests the measurement unit in the vicinity to acquire the three-dimensional data and transmit the three-dimensional data to the central management unit.

(Supplementary Note 3)

The abnormality detection system according to Supplementary note 1, further comprising:

a plurality of the measurement units, and a plurality of the measurement data evaluation units corresponding to the plurality of the measurement units, respectively; and an installation place management unit configured to hold installation place information indicating an installation place of each of the measurement units in advance, wherein when the central management unit receives the alarm indicating that the result of the evaluation on the three-dimensional data in any of the plurality of the measurement units shows that the difference is greater than or equal to the threshold value, the central management unit identifies the measurement unit in the vicinity of the measurement unit which has evaluated that the difference is greater than or equal to the threshold value by referring to the installation place management unit, the central management unit requests the measurement unit in the vicinity to acquire the three-dimensional data, and the central management unit requests the measurement data evaluation unit corresponding to the measurement unit in the vicinity to evaluate the three-dimensional data in the measurement unit in the vicinity and transmit the result of the evaluation to the central management unit.

(Supplementary Note 4)

The abnormality detection system according to any one of Supplementary notes 1 to 3, wherein after the measurement data evaluation unit aligns the three-dimensional data acquired by the measurement unit with the reference three dimensional data, the measurement data evaluation unit evaluates whether the difference is greater than or equal to the threshold value, and transmits the alarm to the central management unit when the result of the evaluation indicates that the difference is greater than or equal to the threshold value.

(Supplementary Note 5)

The abnormality detection system according to any one of Supplementary notes 1 to 3, wherein the measurement data evaluation unit divides an area including the target indicated by the three-dimensional data acquired by the measurement unit and the reference three-dimensional data into a plurality of sections, the measurement data evaluation unit compares the three-dimensional data acquired by the measurement unit with the reference three-dimensional data for each section, and the measurement data evaluation unit evaluates whether or not the difference in each section is greater than or equal to the threshold value, and evaluates a degree of variation of the difference between the sections, and when the difference is greater than or equal to the threshold value in one or more of the sections and the degree of variation of the difference between the sections is greater than or equal to a specified value, the measurement data evaluation unit transmits the alarm to the central management unit.

(Supplementary Note 6)

An abnormality detection device comprising:

a central management unit configured to receive three-dimensional data acquired by a measurement unit from the measurement unit, the measurement unit being configured to acquire at least the three-dimensional data indicating a distance to a target and a shape of the target by performing measurement; and a measurement data evaluation unit configured to hold in advance reference three-dimensional data, the reference three-dimensional data being the three-dimensional data to be a reference acquired by the measurement unit in the past, evaluate whether a difference between the three-dimensional data acquired by the measurement unit and the reference three-dimensional data is greater than or equal to a threshold value, and transmit an alarm to the central management unit when a result of the evaluation indicates that the difference is greater than or equal to the threshold value.

(Supplementary Note 7)

The abnormality detection device according to Supplementary note 6, wherein a plurality of the measurement units are provided, the abnormality detection device further comprises an installation place management unit configured to hold installation place information indicating an installation place of each of the measurement units in advance, when the central management unit receives the alarm indicating that the result of the evaluation on the three-dimensional data in any of the plurality of the measurement units shows that the difference is greater than or equal to the threshold value, the central management unit identifies the measurement unit in the vicinity of the measurement unit which has evaluated that the difference is greater than or equal to the threshold value by referring to the installation place management unit, and the central management unit requests the measurement unit in the vicinity to acquire the three-dimensional data and transmit the three-dimensional data to the central management unit.

(Supplementary Note 8)

The abnormality detection device according to Supplementary note 6, wherein a plurality of the measurement units are provided, a plurality of the measurement data evaluation units corresponding to the plurality of the measurement units, respectively; and an installation place management unit configured to hold installation place information indicating an installation place of each of the measurement units in advance, wherein when the central management unit receives the alarm indicating that the result of the evaluation on the three-dimensional data in any of the plurality of the measurement units shows that the difference is greater than or equal to the threshold value, the central management unit identifies the measurement unit in the vicinity of the measurement unit which has evaluated that the difference is greater than or equal to the threshold value by referring to the installation place management unit, the central management unit requests the measurement unit in the vicinity to acquire the three-dimensional data, and the central management unit requests the measurement data evaluation unit corresponding to the measurement unit in the vicinity to evaluate the three-dimensional data in the measurement unit in the vicinity and transmit the result of the evaluation to the central management unit.

(Supplementary Note 9)

The abnormality detection device according to any one of Supplementary notes 6 to 8, wherein after the measurement data evaluation unit aligns the three-dimensional data acquired by the measurement unit with the reference three dimensional data, the measurement data evaluation unit evaluates whether the difference is greater than or equal to the threshold value, and transmits the alarm to the central management unit when the result of the evaluation indicates that the difference is greater than or equal to the threshold value.

(Supplementary Note 10)

The abnormality detection device according to any one of Supplementary notes 6 to 8, wherein the measurement data evaluation unit divides an area including the target indicated by the three-dimensional data acquired by the measurement unit and the reference three-dimensional data into sections, the measurement data evaluation unit compares the three-dimensional data acquired by the measurement unit with the reference three-dimensional data for each section, and the measurement data evaluation unit evaluates whether or not the difference in each section is greater than or equal to the threshold value, and evaluates a degree of variation of the difference between the sections, and when the difference is greater than or equal to the threshold value in one or more of the sections and the degree of variation of the difference between the sections is greater than or equal to a specified value, the measurement data evaluation unit transmits the alarm to the central management unit.

(Supplementary Note 11)

An abnormality detection method performed by an abnormality detection device configured to receive three-dimensional data acquired by a measurement unit from the measurement unit, the measurement unit being configured to acquire at least the three-dimensional data indicating a distance to a target and a shape of the target by performing measurement, the abnormality detection method comprising:

a first step of holding in advance reference three-dimensional data, the reference three-dimensional data being the three-dimensional data to be a reference acquired by the measurement unit in the past; and a second step of evaluating whether a difference between the three-dimensional data acquired by the measurement unit and the reference three-dimensional data is greater than or equal to a threshold value, and sending an alarm when a result of the evaluation indicates that the difference is greater than or equal to the threshold value.

(Supplementary Note 12)

The abnormality detection method according to Supplementary note 11, wherein a plurality of the measurement units are provided, and the abnormality detection method further comprises:

a third step of holding installation place information indicating an installation place of each of the measurement units in advance, a fourth step of, when the alarm indicating that the result of the evaluation on the three-dimensional data in any of the plurality of the measurement units shows that the difference is greater than or equal to the threshold value is sent in the second step, identifying the measurement unit in the vicinity of the measurement unit which has evaluated that the difference is greater than or equal to the threshold value by referring to the installation place information; and a fifth step of acquiring the three-dimensional data in the measurement unit in the vicinity.

(Supplementary Note 13)

The abnormality detection method according to Supplementary note 11, wherein a plurality of the measurement units are provided, and the abnormality detection method further comprises:

a third step of holding installation place information indicating an installation place of each of the measurement units in advance, a fourth step of, when the alarm indicating that the result of the evaluation on the three-dimensional data in any of the plurality of the measurement units shows that the difference is greater than or equal to the threshold value is sent in the second step, identifying the measurement unit in the vicinity of the measurement unit which has evaluated that the difference is greater than or equal to the threshold value by referring to the installation place information; and a fifth step of acquiring the result of the evaluation on three-dimensional data in the measurement unit in the vicinity.

17

(Supplementary Note 14)

The abnormality detection method according to any one of Supplementary notes 11 to 13, wherein in the second step, after the three-dimensional data acquired by the measurement unit is aligned with the reference three dimensional data, it is evaluated whether the difference is greater than or equal to the threshold value, and the alarm is sent when the result of the evaluation indicates that the difference is greater than or equal to the threshold value.

(Supplementary Note 15)

The abnormality detection method according to any one of Supplementary notes 11 to 13, wherein in the second step, an area including the target indicated by the three-dimensional data acquired by the measurement unit and the reference three-dimensional data is divided into a plurality of sections, the three-dimensional data acquired by the measurement unit is compared with the reference three-dimensional data for each section, and it is evaluated whether or not the difference in each section is greater than or equal to the threshold value, and a degree of variation of the difference between the sections is evaluated, and when the difference is greater than or equal to the threshold value in one or more of the sections and the degree of variation of the difference between the sections greater than or equal to a specified value, the alarm is sent.

(Supplementary Note 16)

A non-transitory computer readable medium storing a program for causing a computer configured to receive three-dimensional data acquired by a measurement unit from the measurement unit, the measurement unit being configured to acquire at least the three-dimensional data indicating a distance to a target and a shape of the target by performing measurement to execute:

a first procedure of holding in advance reference three-dimensional data, the reference three-dimensional data being the three-dimensional data to be a reference acquired by the measurement unit in the past; and a second procedure of evaluating whether a difference between the three-dimensional data acquired by the measurement unit and the reference three-dimensional data is greater than or equal to a threshold value, and sending an alarm when a result of the evaluation indicates that the difference is greater than or equal to the threshold value.

REFERENCE SIGNS LIST

10 ABNORMALITY DETECTION DEVICE
11 CENTRAL MANAGEMENT UNIT
12 MEASUREMENT DATA EVALUATION UNIT
13 MEASUREMENT UNIT INSTALLATION PLACE MANAGEMENT UNIT
20 MEASUREMENT UNIT
30 COMPUTER
301 PROCESSOR
302 MEMORY
303 STORAGE
304 INPUT/OUTPUT INTERFACE
3041 DISPLAY DEVICE
3042 INPUT DEVICE
3043 SOUND OUTPUT DEVICE
305 COMMUNICATION INTERFACE

18

What is claimed is:

1. An abnormality detection system comprising:

a measurement unit configured to acquire at least three-dimensional data indicating a distance to a target and a shape of the target by performing measurement;

a central management unit configured to receive the three-dimensional data acquired by the measurement unit from the measurement unit; and a measurement data evaluation unit configured to hold in advance reference three-dimensional data, the reference three-dimensional data being the three-dimensional data to be a reference acquired by the measurement unit in the past, evaluate whether a difference between the three-dimensional data acquired by the measurement unit and the reference three-dimensional data is greater than or equal to a threshold value, and transmit an alarm to the central management unit when a result of the evaluation indicates that the difference is greater than or equal to the threshold value, wherein the measurement data evaluation unit divides an area including the target indicated by the three-dimensional data acquired by the measurement unit and the reference three-dimensional data into a plurality of sections, the measurement data evaluation unit compares the three-dimensional data acquired by the measurement unit with the reference three-dimensional data for each section, and the measurement data evaluation unit evaluates whether or not the difference in each section is greater than or equal to the threshold value, and evaluates a degree of variation of the difference between the sections, and when the difference is greater than or equal to the threshold value in one or more of the sections and the degree of variation of the difference between the sections is greater than or equal to a specified value, the measurement data evaluation unit transmits the alarm to the central management unit.

2. The abnormality detection system according to claim 1, further comprising:

a plurality of the measurement units;

an installation place management unit configured to hold installation place information indicating an installation place of each of the measurement units in advance, wherein when the central management unit receives the alarm indicating that the result of the evaluation on the three-dimensional data in any of the plurality of the measurement units shows that the difference is greater than or equal to the threshold value, the central management unit identifies the measurement unit in the vicinity of the measurement unit which has evaluated that the difference is greater than or equal to the threshold value by referring to the installation place management unit, and the central management unit requests the measurement unit in the vicinity to acquire the three-dimensional data and transmit the three-dimensional data to the central management unit.

3. The abnormality detection system according to claim 1, further comprising:

a plurality of the measurement units, and a plurality of the measurement data evaluation units corresponding to the plurality of the measurement units, respectively; and an installation place management unit configured to hold installation place information indicating an installation place of each of the measurement units in advance, wherein when the central management unit receives the alarm indicating that the result of the evaluation on the three-dimensional data in any of the plurality of the measurement units shows that the difference is greater than or equal to the threshold value, the central management unit identifies the measurement unit in the vicinity of the measurement unit which has evaluated that the difference is greater than or equal to the threshold value by referring to the installation place management unit, the central management unit requests the measurement unit in the vicinity to acquire the three-dimensional data, and the central management unit requests the measurement data evaluation unit corresponding to the measurement unit in the vicinity to evaluate the three-dimensional data in the measurement unit in the vicinity and transmit the result of the evaluation to the central management unit.

4. The abnormality detection system according to claim 1, wherein after the measurement data evaluation unit aligns the three-dimensional data acquired by the measurement unit with the reference three dimensional data, the measurement data evaluation unit evaluates whether the difference is greater than or equal to the threshold value, and transmits the alarm to the central management unit when the result of the evaluation indicates that the difference is greater than or equal to the threshold value.

5. An abnormality detection device comprising:

a central management unit configured to receive three-dimensional data acquired by a measurement unit from the measurement unit, the measurement unit being configured to acquire at least the three-dimensional data indicating a distance to a target and a shape of the target by performing measurement; and a measurement data evaluation unit configured to hold in advance reference three-dimensional data, the reference three-dimensional data being the three-dimensional data to be a reference acquired by the measurement unit in the past, evaluate whether a difference between the three-dimensional data acquired by the measurement unit and the reference three-dimensional data is greater than or equal to a threshold value, and transmit an alarm to the central management unit when a result of the evaluation indicates that the difference is greater than or equal to the threshold value, wherein the measurement data evaluation unit divides an area including the target indicated by the three-dimensional data acquired by the measurement unit and the reference three-dimensional data into sections, the measurement data evaluation unit compares the three-dimensional data acquired by the measurement unit with the reference three-dimensional data for each section, and the measurement data evaluation unit evaluates whether or not the difference in each section is greater than or equal to the threshold value, and evaluates a degree of variation of the difference between the sections, and when the difference is greater than or equal to the threshold value in one or more of the sections and the degree of variation of the difference between the sections is greater than or equal to a specified value, the measurement data evaluation unit transmits the alarm to the central management unit.

6. The abnormality detection device according to claim 5, wherein a plurality of the measurement units are provided, the abnormality detection device further comprises an installation place management unit configured to hold installation place information indicating an installation place of each of the measurement units in advance, when the central management unit receives the alarm indicating that the result of the evaluation on the three-dimensional data in any of the plurality of the measurement units shows that the difference is greater than or equal to the threshold value, the central management unit identifies the measurement unit in the vicinity of the measurement unit which has evaluated that the difference is greater than or equal to the threshold value by referring to the installation place management unit, and the central management unit requests the measurement unit in the vicinity to acquire the three-dimensional data and transmit the three-dimensional data to the central management unit.

7. The abnormality detection device according to claim 5, wherein a plurality of the measurement units are provided, a plurality of the measurement data evaluation units corresponding to the plurality of the measurement units, respectively; and an installation place management unit configured to hold installation place information indicating an installation place of each of the measurement units in advance, wherein when the central management unit receives the alarm indicating that the result of the evaluation on the three-dimensional data in any of the plurality of the measurement units shows that the difference is greater than or equal to the threshold value, the central management unit identifies the measurement unit in the vicinity of the measurement unit which has evaluated that the difference is greater than or equal to the threshold value by referring to the installation place management unit, the central management unit requests the measurement unit in the vicinity to acquire the three-dimensional data, and the central management unit requests the measurement data evaluation unit corresponding to the measurement unit in the vicinity to evaluate the three-dimensional data in the measurement unit in the vicinity and transmit the result of the evaluation to the central management unit.

8. The abnormality detection device according to claim 5, wherein after the measurement data evaluation unit aligns the three-dimensional data acquired by the measurement unit with the reference three dimensional data, the measurement data evaluation unit evaluates whether the difference is greater than or equal to the threshold value, and transmits the alarm to the central management unit when the result of the evaluation indicates that the difference is greater than or equal to the threshold value.

9. An abnormality detection method performed by an abnormality detection device configured to receive three-dimensional data acquired by a measurement unit from the measurement unit, the measurement unit being configured to acquire at least the three-dimensional data indicating a distance to a target and a shape of the target by performing measurement, the abnormality detection method comprising:

a first step of holding in advance reference three-dimensional data, the reference three-dimensional data being the three-dimensional data to be a reference acquired by the measurement unit in the past; and a second step of evaluating whether a difference between the three-dimensional data acquired by the measurement unit and the reference three-dimensional data is greater than or equal to a threshold value, and sending an alarm when a result of the evaluation indicates that the difference is greater than or equal to the threshold value, wherein in the second step, an area including the target indicated by the three-dimensional data acquired by the measurement unit and the reference three-dimensional data is divided into a plurality of sections, the three-dimensional data acquired by the measurement unit is compared with the reference three-dimensional data for each section, and it is evaluated whether or not the difference in each section is greater than or equal to the threshold value, and a degree of variation of the difference between the sections is evaluated, and when the difference is greater than or equal to the threshold value in one or more of the sections and the degree of variation of the difference between the sections greater than or equal to a specified value, the alarm is sent.

10. The abnormality detection method according to claim 9, wherein a plurality of the measurement units are provided, and the abnormality detection method further comprises:

a third step of holding installation place information indicating an installation place of each of the measurement units in advance, a fourth step of, when the alarm indicating that the result of the evaluation on the three-dimensional data in any of the plurality of the measurement units shows that the difference is greater than or equal to the threshold value is sent in the second step, identifying the measurement unit in the vicinity of the measurement unit which has evaluated that the difference is greater than or equal to the threshold value by referring to the installation place information; and a fifth step of acquiring the three-dimensional data in the measurement unit in the vicinity.

11. The abnormality detection method according to claim 9, wherein a plurality of the measurement units are provided, and the abnormality detection method further comprises:

a third step of holding installation place information indicating an installation place of each of the measurement units in advance, a fourth step of, when the alarm indicating that the result of the evaluation on the three-dimensional data in any of the plurality of the measurement units shows that the difference is greater than or equal to the threshold value is sent in the second step, identifying the measurement unit in the vicinity of the measurement unit which has evaluated that the difference is greater than or equal to the threshold value by referring to the installation place information; and a fifth step of acquiring the result of the evaluation on three-dimensional data in the measurement unit in the vicinity.

12. The abnormality detection method according to claim 9, wherein in the second step, after the three-dimensional data acquired by the measurement unit is aligned with the reference three dimensional data, it is evaluated whether the difference is greater than or equal to the threshold value, and the alarm is sent when the result of the evaluation indicates that the difference is greater than or equal to the threshold value.

* * * * *